Sept. 11, 1962 G. W. R. HORNAUER ET AL 3,053,446
CALCULATING MACHINES

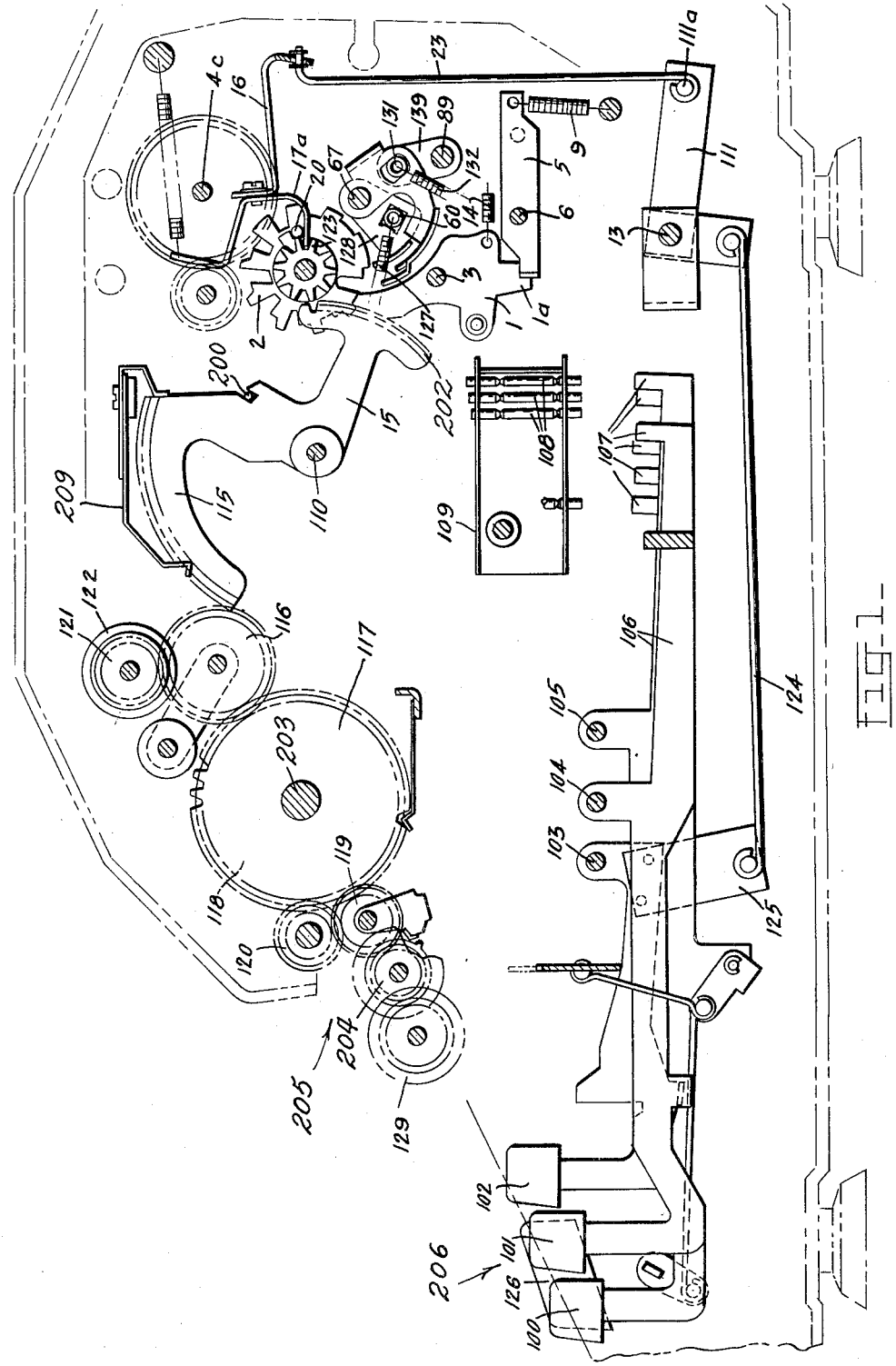

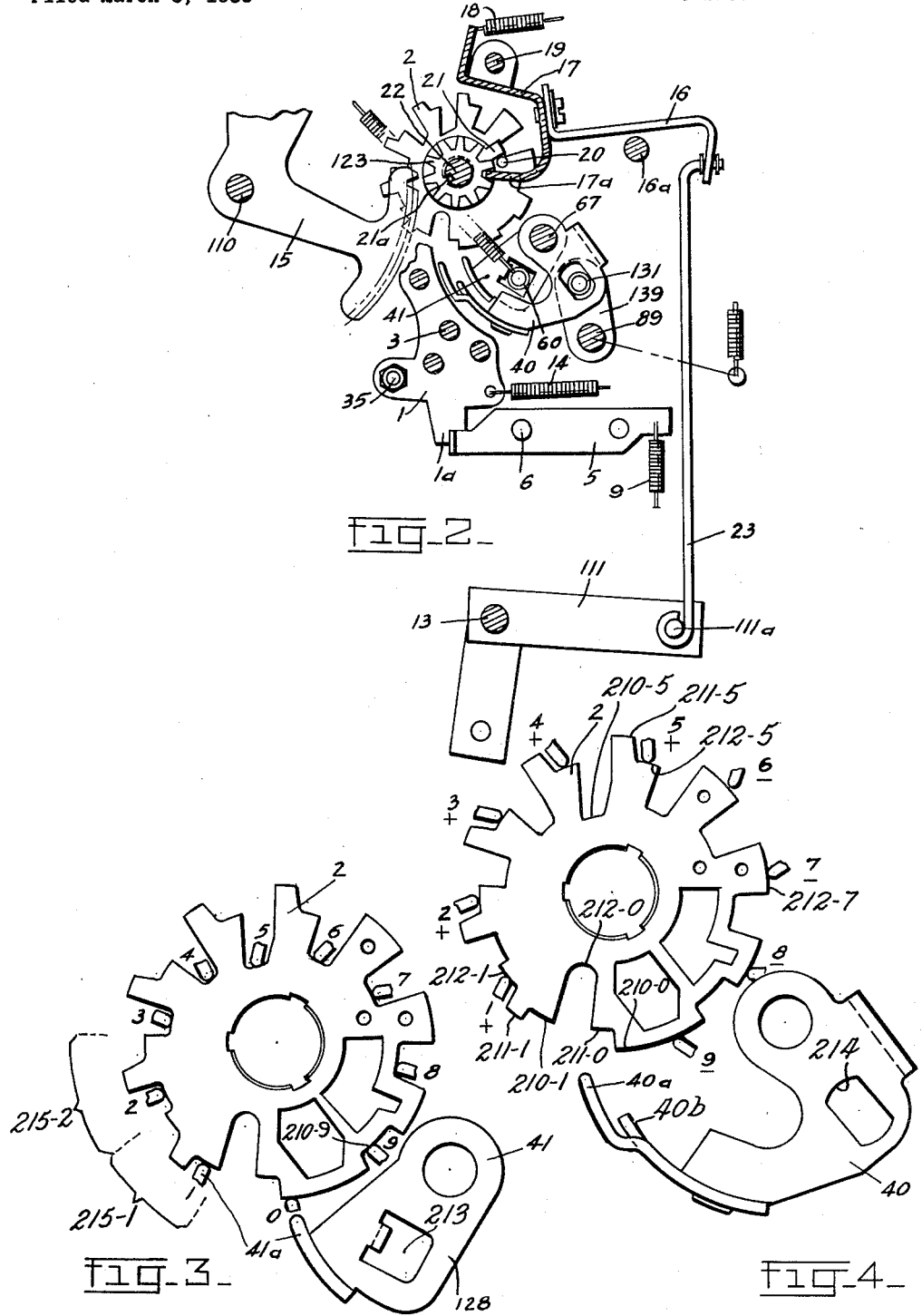

Filed March 3, 1959 9 Sheets-Sheet 3

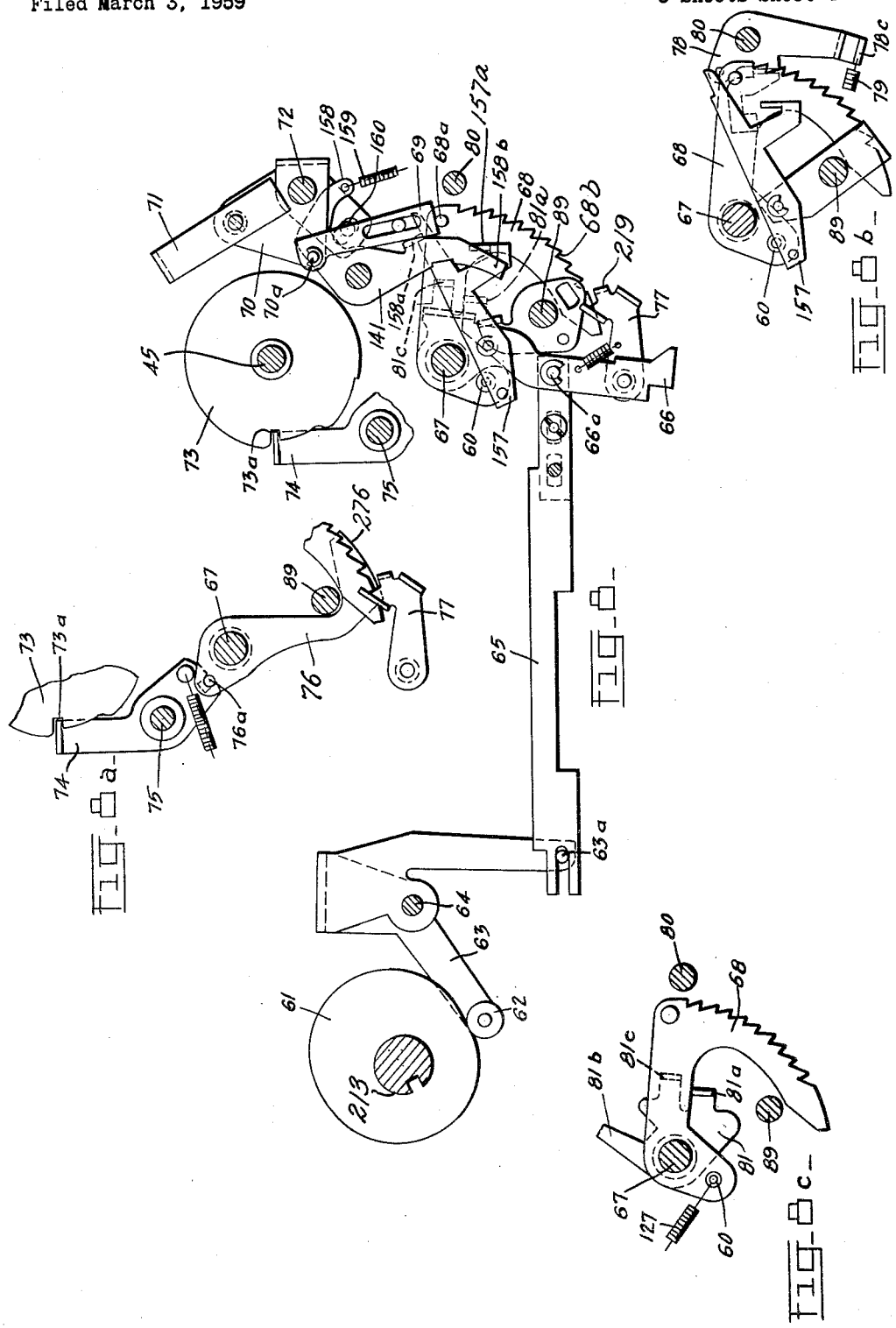

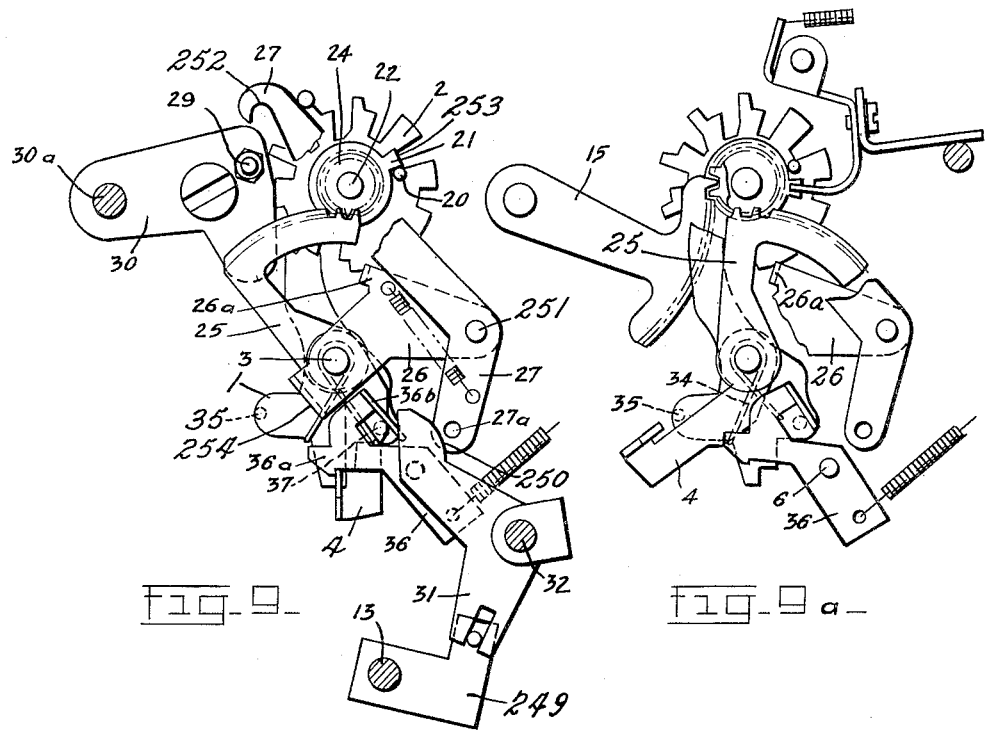
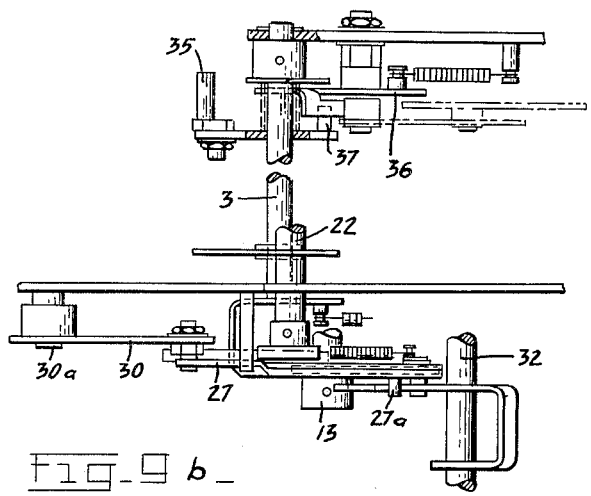

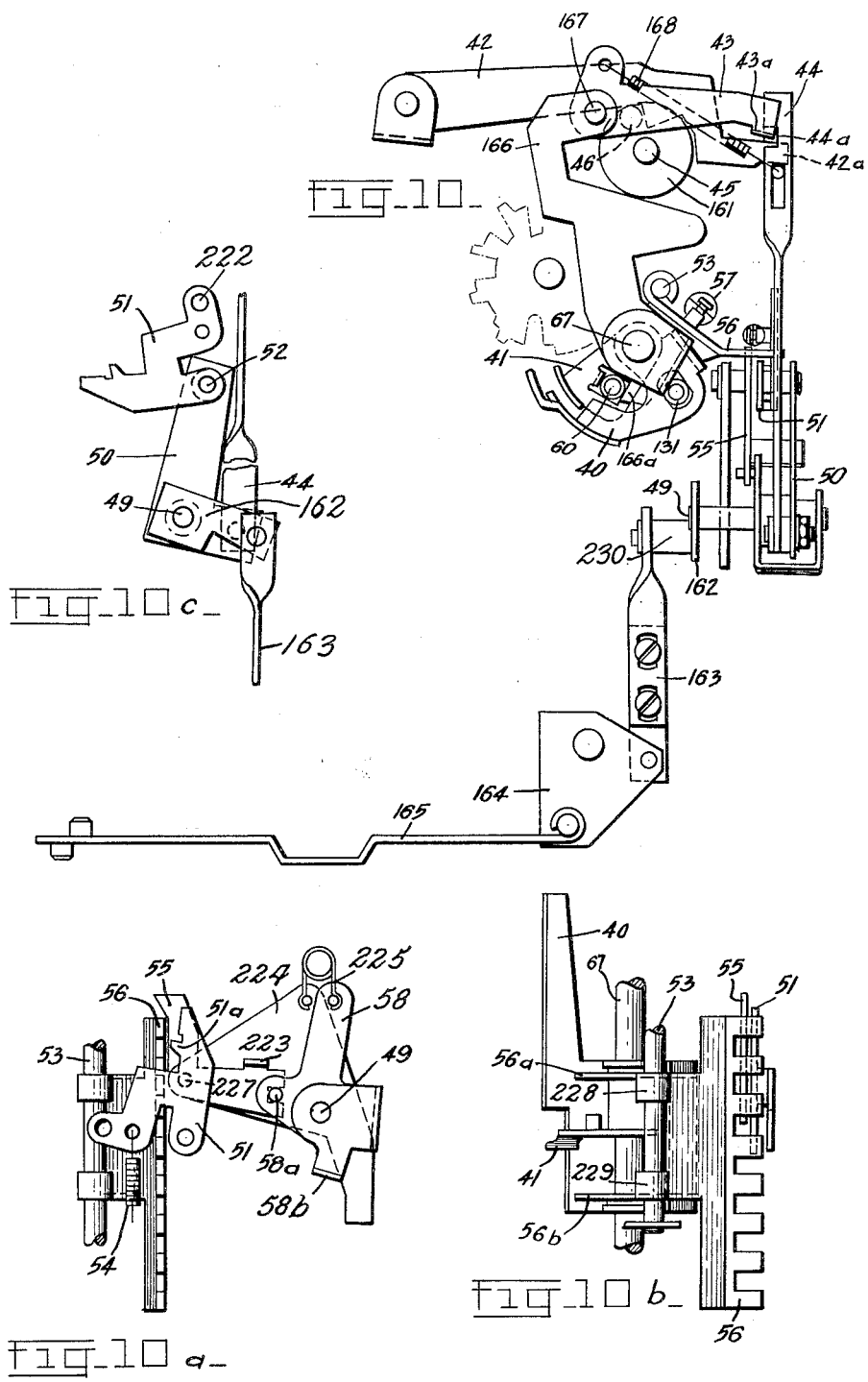

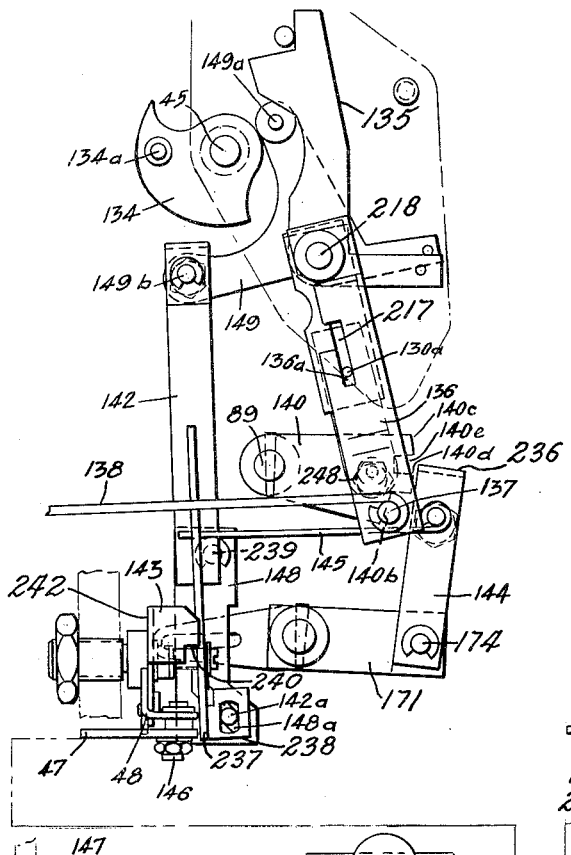
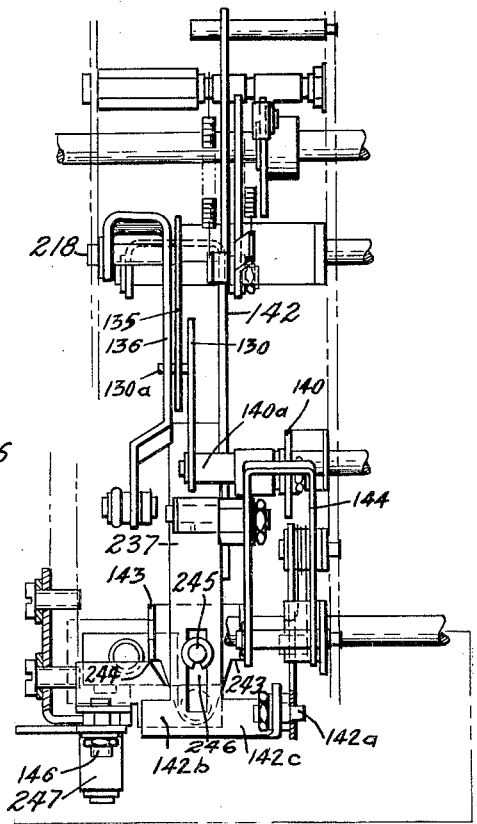
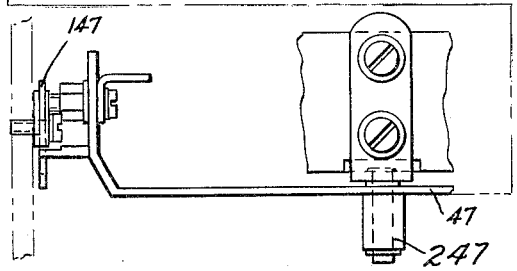
FIG. 12a
FIG. 12
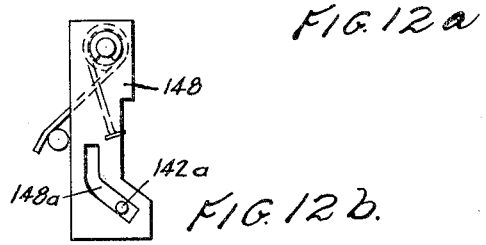
FIG. 12b.
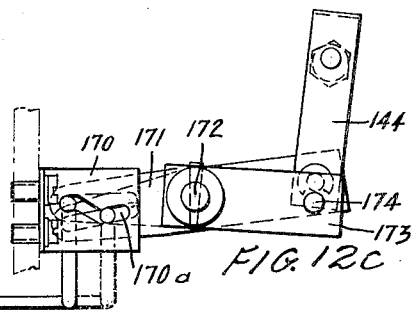
FIG. 12c

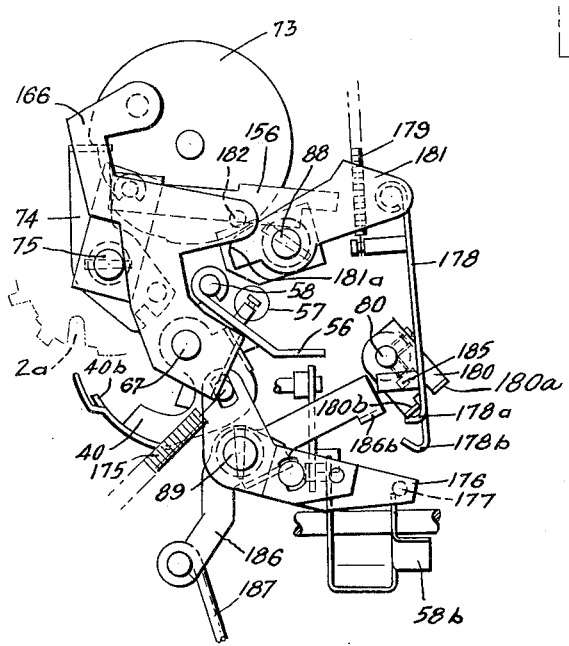
FIG. 14a
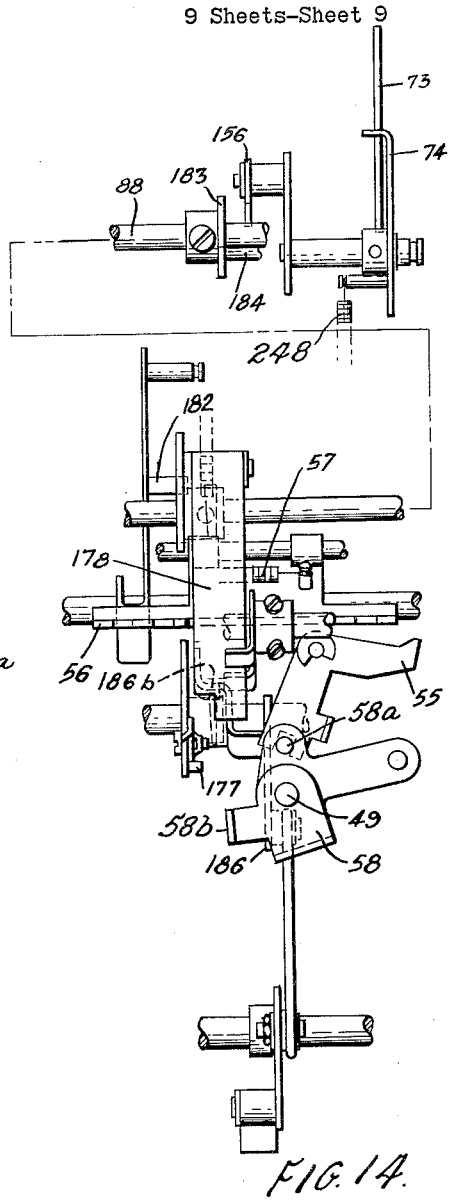
FIG. 14.
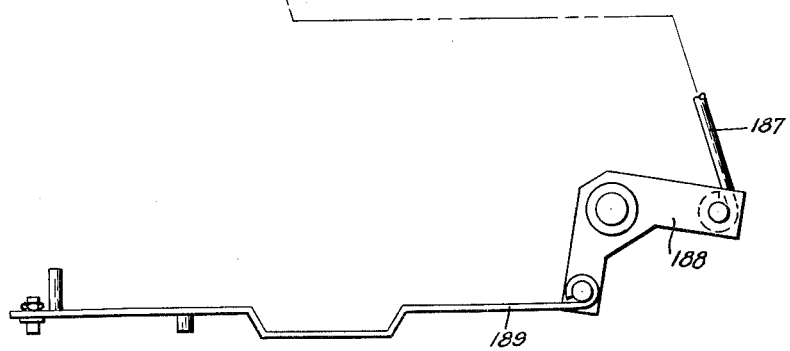

United States Patent Office 3,053,446
Patented Sept. 11, 1962

3,053,446
CALCULATING MACHINES
Gunter Wilhelm Robert Hornauer and Horst Georg Gunter Denzin, Berlin, Germany, assignors to Hamann-Rechenmaschinen G.m.b.H., Berlin, Germany
Filed Mar. 3, 1959, Ser. No. 796,823
6 Claims. (Cl. 235—63)

The invention relates to mechanical calculators, and it particularly pertains to such calculators having a short-cut multiplication mechanism.

A calculator for automatic short-cut multiplication is known in which multiplicand and multiplier each have a factor mechanism capable of receiving plural order values and are served by one common ten-key keyboard in such a fashion that when the multiplier is entered it is entered simultaneously into both factor mechanisms in parallel, by means of a common step-switch arrangement. Upon the depression of a function key, the multiplier factor mechanism is disengaged from the entry mechanism and also from the step-switch arrangement and the multiplicand mechanism is cleared, so that the multiplicand may now be entered directly. Depression of the function key arrests the multiplier mechanism in a half-step position so that the entry members which are actuated by the keyboard may pass freely between the otherwise cooperating members of the multiplier mechanism and thus enter the multiplicand. Another machine of this kind has a shunt member which is arranged between the multiplicand mechanism and the multiplier mechanism and which in normal, or plus, multiplication is disposed by the multiplier mechanism in certain shunt positions in which it causes the multiplicand mechanism to revolve, for the purpose of a short-cut division, in either positive direction, or in negative direction, or to stand still.

An object of the invention is to simplify multiplication by a constant multiplier value so that the operator is required only to enter a multiplicand value in the keyboard and to depress the multiplication operation initiating key.

Another object is to enter a value into the multiplier factor storage mechanism only from the multiplicand factor mechanism which, in turn, may receive values from the keyboard (via a pin carriage, for example), or from a result register via a back-transfer mechanism.

Another object is to permit clearance of the multiplier storage mechanism only by a key which enters a new multiplier value into the multiplicand factor mechanism from which the new multiplier factor subsequently may be entered into the multiplier factor storage mechanism.

Still another object is to enter values into a pin carriage during a multiplication or division operation without affecting either of the latter operations.

According to the invention a calculating machine for automatic short-cut multiplication comprises: a plural-order multiplicand factor mechanism and a plural-order multiplier factor mechanism; a common ten-key keyboard whereby multipliers and multiplicands may be entered; a first function initiating key ("×"-key) which, upon actuation, clears the multiplicand factor mechanism and transfers a previously keyed-in value from the keyboard into this factor mechanism; a second function initiating key ("=" key) which, upon actuation, enters a newly keyed-in value from the keyboard into the multiplicand factor mechanism and at the same time transfers the previously entered multiplier value from the multiplicand factor mechanism, into the multplier factor mechanism, followed by initiation of the automatic multiplying operation.

The multiplicand factor mechanism operates as a transfer mechanism which may receive values either from a temporary entry mechanism, a pin carriage in particular, which cooperates with a keyboard or, in back transfer, it may receive values from the counting register, and subsequently transfer such values to the multiplier mechanism which comprises known scannable step discs or similar devices. It is only upon depression of the second function initiating key that a value is transferred from the multiplicand factor mechanism into the multiplier mechanism; therefore, at any time prior to depression of the second function key, the selection of the multiplier may be changed merely by entering a new value into the keyboard and depressing the first function key.

Two scanners are provided for sequentially sensing the step discs of the multiplier mechanism, of which one scanner controls the number of revolutions of the clutch for the calculating mechanism and the other of which scanners controls the plus or minus actuation of the numeral wheels.

In order that the invention may be practiced by others, it will be described in terms of an express embodiment, given by way of example only, and with reference to the accompanying drawing in which:

FIG. 1 is a right side view, in section, of a calculating machine embodying the invention;

FIG. 2 is a right side view, in section, of the multiplier factor mechanism and the scanners therefor;

FIGS. 3, 4, 5 and 6 show the multiplier value scanners in various operating positions;

Figure 13:
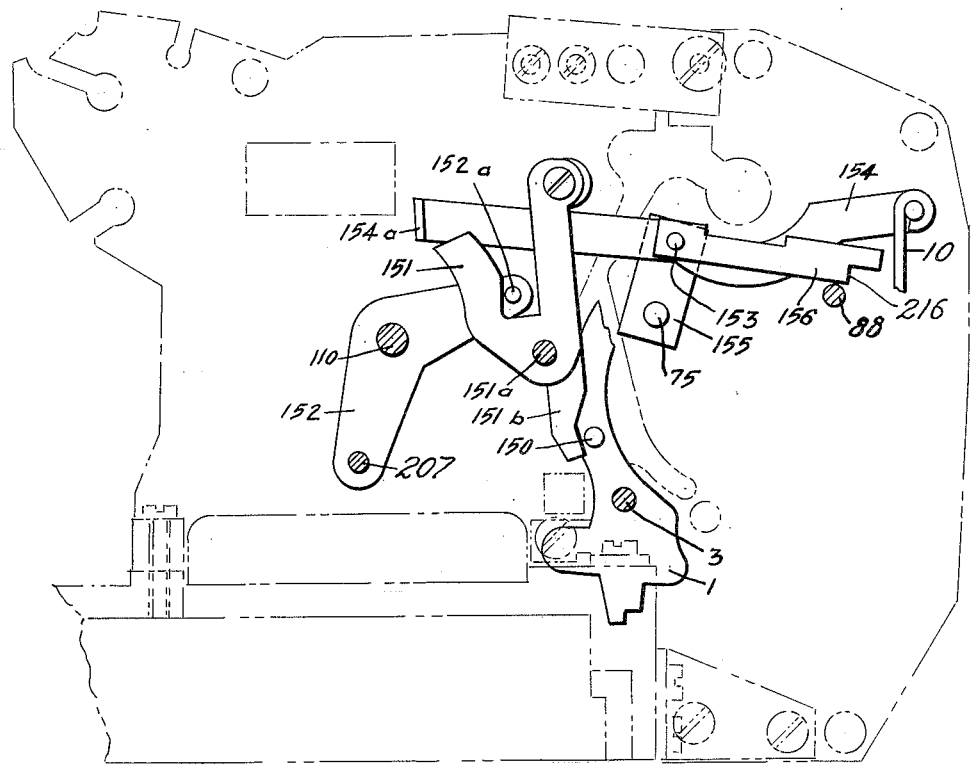
Figure 11:
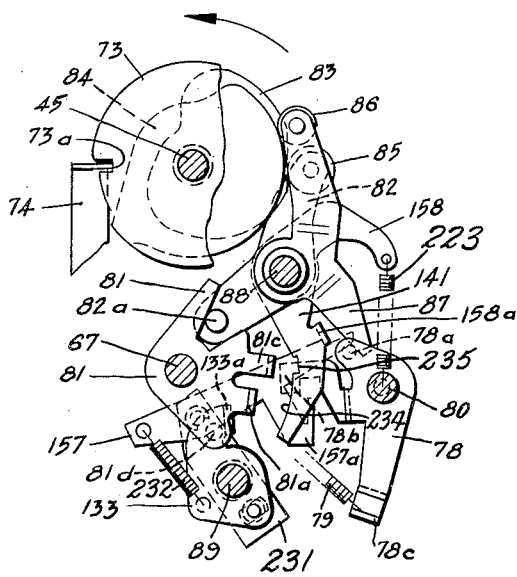
Figure 11A:
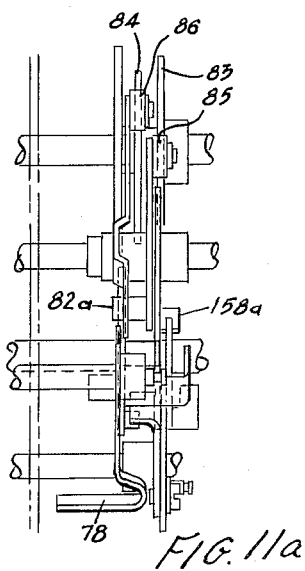

FIGS. 8, 8a, 8b, and 8c are right side sectional views of the multiplier count-out control mechanism;

FIGS. 9 and 9a are right side views, in section, of the multiplier factor clearing mechanism;

FIG. 9b is a top view of the mechanism shown in FIGS. 9 and 9a;

FIGS. 10 and 10c are right side views, in section, of the multiplier value scanning mechanism and the ordinal escapement controls associated therewith;

FIGS. 10a and 10b are top views of the scanner escapement mechanism;

FIG. 11 is a right side view, in section, of a portion of the multiplier control mechanism;

FIG. 11a is a top view of the multiplier control mechanism;

FIG. 12 is a view, as seen from the rear of the machine, of the plus-minus actuating control mechanism;

FIGS. 12a, 12b, and 12c are right side views, in section, of the mechanism shown in FIG. 12;

FIG. 13 is a right side view, in section, of a portion of the value transfer mechanism;

FIG. 14 is a rear view, and FIG. 14a is a right side sectional view of the multiplication terminating mechanism.

INTRODUCTION

The present invention is disclosed as being embodied in a calculating machine such as the commercially available Hamann 300 machine, which is of the general type referred to (such as in the Patent No. 1,566,650) as a polyphase, non-reversible type of machine, i.e., the numeral wheel actuators invariably rotate in only one direction regardless of whether the machine performs addition or subtraction. A reverse gearing is interposed between the actuators and the numeral wheels for effecting the required reversal of drive to the numeral wheels. In the case of the Hamann 300 machine a portion of the reverse gearing for each numeral wheel is carried on the product register carriage and is constantly engaged with the numeral wheel. The reverse gearing comprises in part, gears 119 and 120 (FIG. 1) through which the drive is alternately transmitted from an actuator gear 117. Such alteration of drive transmission is effected by shifting the carriage by "half-steps" relative to the actuator gear 117, as is fully described in the U.S. Patent No. 1,788,192 issued January 6, 1931, to C. Hamann, page 3, lines 14–30.

In the patent, multiplication is described on page 3, lines 31–76 as being performed by repeated positive cycles of numeral wheel actuation in the successive orders, and each shifting operation comprises a simple ordinal shifting operation between each successive pair of ordinal multiplying operations. According to the present invention, however, multiplying operations are carried out in short-cut fashion in each order which may involve both positive and negative cycles of numeral wheel actuation in a given order. For this reason the present shifting mechanism may be best understood in connection with the description of the shifting mechanism in the patent as related to division operations wherein both positive and negative cycles of actuation occur in each order of operations. This description appears at page 3, line 77 to page 4 line 12 of the patent.

In the initial full ordinal position of the register, the reverse gearing is conditioned for positive actuation of the numeral wheels, so that addition is performed in the usual manner by depressing the plus key. Now, assuming that subtraction is to be performed, then the carriage must be shifted a half-step backward (to the left as the operator faces the machine) to change the reverse gearing to the negative position. This is accomplished upon depression of the subtraction key which first causes such a half step of leftward shift before effecting the actuating operation.

If positive actuation is to follow a negative actuation, depression of the plus key first causes a half-step forward of the carriage (toward the right) before initiating a plus operation.

The half-step shift mechanism, described hereinafter, is supplementary to the usual full step shift mechanism which is operated by conventional right and left shift keys. It should be observed, however, that the full step shift mechanism invariably shifts the register carriage a full ordinal step regardless of whether the carriage is in a positive or a negative position at the time the full ordinal step is initiated. Thus, if the carriage stands in a "positive" position, the depression of a respective shift key results in a full ordinal shift to the next adjacent "positive" position. Conversely, if the carriage stands in a "negative" position, the depression of a shift key results in a full ordinal shift to the next adjacent "negative" position.

The Hamann 300 machine is a semi-automatic type of machine in that multiplication is performed by holding down the plus bar for the desired number of cycles in each order of multiplication. Short-cut multiplication may be manually performed by use of the minus bar as well as the plus bar; however, it will be noted that in alternating from a positive actuation in one order to a negative actuation in an adjacent higher order, the machine performs a full step of shifting operations in one direction followed by a half step of shifting operation in the other direction to cause a net number of one half order of rightward shift. On the other hand, if the operator alternates from negative actuation in one order to positive actuation in the adjacent higher order, the machine performs one and a half ordinal steps of shifting in a rightward direction. Obviously, if a series of positive actuations or a series of negative actuations are to be performed in successive adjacent orders, only a full ordinal shift is required between each ordinal actuating operation.

The above-described type of shifting mechanism is employed in the machine in which the present invention is embodied and a full step of shift invariably occurs after each ordinal multiplying operation. Since such automatic shifting is conventional in multiplying calculating machines, further mention is believed unnecessary, and emphasis will be placed on the short-cut sensing mechanism which automatically determines half-steps of shift, if any, in appropriate directions, as well as determining the number of cycles of actuation of the numeral wheels for each ordinal multiplying operation.

A calculating machine, according to the invention, comprises certain conventional elements among which are a ten-key keyboard, a pin carriage, sensing elements for the pin carriage, and a product register. There are also various gears, cams, and levers which shall not be described in detail. When a value key, for example, the value key 101 is depressed in the conventional ten-key keyboard an appropriate lever 106 is rocked about its shaft 104 so that its nose 107 rises against a corresponding intermediate lever (not shown) which then displaces a pin 108 in the pin carriage 109. The shaft 104 carries several key levers. The same is true of the shafts 103 and 105 which together with the keys 100 and 102 are merely representative of this part of the machine. Each depression of a value key causes the pin carriage to escape one order in conventional fashion. Upon completion of the entry, the pin carriage 109 contains as many displaced pins 108 as there are orders in the entered value. For example, the entry of the value "123" results in the displacement of three pins 108.

Upon depression of one of several function keys, for example, the "×" key 126 or the "plus" key in the Hamann 300 machine, various conventional cams and linkages are actuated, including pin carriage scanning devices (not shown) but carrying each a pin 200 for selective engagement with and adjustment of respective entry segments 15 of the type disclosed in the patent application S.N. 366,405 filed July 7, 1953, now U.S. Patent No. 2,940,664. In view of this prior art, it is sufficient to state that the selectively entered value appears, in consequence of the depression of the "×" key, in the check dials 122. Simultaneously, the intermediate gears 116 rotate actuator control segments 117 to value representative positions. The entry segment 15 forms part of an actuator system which is well known, being incorporated in a commercially available calculating machine sold under the name Hamann 300 and shown as an entry segment 4 in the drawing of the previously mentioned Patent No. 2,940,664. It will suffice to state here that the positions of the actuator control segments 117 (FIG. 1) subsequently control the movement of uni-directional actuator gears 118 on shaft 203.

The movement of the actuator gears 118 is transmitted to the dials of the result register 204 in a carriage generally indicated at 205. In an additive operation, the wide actuator gear 118 drives a gear 119 which is enmeshed with the numeral wheel gear 204. A spool gear 120, comprising a pair of gears connected by an integral hub, is also driven by the wide gear because one of its geared portions is constantly engaged with the latter; however, at this time the gear 119 is out of the plane of both of the double gears 120 and is directly driven by gear 118.

In a subtractive operation, the carriage 205 is shifted axially with respect to shaft 203 by an increment which is less than the distance measuring a full order of escapement between adjacent numeral wheels of register 204. The actuator gear 118, as well as the gears 120, which are in the carriage 205, remain stationary. Such a partial increment of escapement disengages the gear 119 from the actuator gears 118 and engages it with one of the gears 120. Since one gear has been interposed in the additive drive gear chain, the drive from the actuator gear 118 to register 204 is reversed. Thus, if the actuator shaft 203 is rotated while the segments 15 are in the selectively set positions, it will drive the result dials 204 either additively or subtractively, depending upon the full step or partial step position escapement of the carriage 205, all as is described in the previously mentioned Patent No. 1,788,192. For purposes of brevity, a partial step of escapement is referred to hereinafter as a half step of escapement. The structure described so far is conventional and substantially embodied in the previously mentioned Hamann 300 calculating machine.

*Multiplication*

It is known that mechanical calculators do not perform multiplication in the manner in which it is performed by a person calculating with pencil on paper, namely, in a manner in which intermediate products are formed by true multiplication and then summarized. A mechanical calculator solves this problem conventionally by repeated cycles of numeral wheel actuation in successive orders.

A machine according to the invention solves a problem of multiplying a given value of "9" by a multiplier value of "99" as follows:

| Initial positive position | no cycle of actuation. |
|---|---|
| Half step shift, −9 | one subtractive cycle. |
| Net half step shift, +90 | one additive cycle. |
| Half step shift, −90 | one subtractive cycle. |
| Net half step shift, +900 | one additive cycle. |

It is obvious that the total number of cycles through which the machine operates to produce the answer is greatly reduced. One of the requirements of a machine which performs positive and negative cycles of actuation by half-step positions of the carriage, is the control of the carriage according to the value of the successive multiplier digits.

Not only must the shift of the carriage be controlled by the value of the multiplier digit, but the machine must also determine for every multiplier order whether or not the multiplier value is to be shortcut.

*Entry of the Multiplier—First Phase*

The multiplier is entered by successive depressions of the keys in the ten key-keyboard 206. Corresponding pins in the pin carriage 109 are raised and the pin carriage 109 escapes one step per order of value entry. The selected value is represented in the pin carriage 109 by the setting of the pins 108 and the escaped position of the pin carriage 109.

The "×" key 126 is then depressed to enter the selected value into the check dials 122 and to clear a multiplier storage mechanism of any previously entered value standing therein. Depression of the "×" key 126 acts through a motor driven clutch and other conventional means (not shown) to rock a pair of levers 152 (FIG. 13) which carry a shaft 207. The movement of the shaft 207 causes the entering operation as described in the mentioned U.S. Patent No. 2,940,664, and shaft 207 corresponds to the shaft 5 shown in said patent. Accordingly, the selected value appears in the dials 122 and the segments 115 are likewise set in value representative positions. No value appears in the result register 204 because the depression of the "×" key does not initiate the operation of the numeral wheel actuation shaft 203. The depression of the "×" key, however, results in the restoration of the pin carriage 109 through conventional means. Also, such depression causes resetting of the multiplier storage discs 2, in a manner fully described hereinafter.

*Entry of the Multiplicand*

The multiplicand is then entered in the keyboard and the pin carriage in the fashion described for the multiplier. Again the state of the pin carriage 109 represents the selected multiplicand value by the setting of the pins 108 and by the escaped position of the carriage. After the entry of the multiplicand, the "=" key is depressed. This key is not shown because its construction is conventional; however, its function is to transfer the multiplier value standing in the check dials 122 into the multiplier factor storage members 2, and thereafter to enter the selected multiplicand value, now standing in the pin carriage, into the check dials 122.

The depression of the "=" key initiates the operation of a clutch and suitable mechanisms which return the gear segments 115 to the positions they occupied before the depression of the "×" key 126. According to the previously mentioned U.S. Patent No. 2,940,664, the value standing in the dials 122 is cleared therefrom and the gear segments 115 are restored to initial positions before the entry of a subsequent (multiplicand) value therein. The clearing of the multiplier from the gear segments 115 therefore is incidental to the entry of the multiplicand. Meanwhile, the operation which has been initiated by depression of the "=" key continues and the value of the multiplicand is entered into the dials 122, taking the place of the previously cleared multiplier value.

Immediately upon depression of the "=" key, and before the multiplier is cleared from the dials 122 the following mechanical interactions take place for the purpose of transferring the multiplier into the multiplier mechanism, certain elements of which are shown in the right part of FIG. 1. The depression of the "=" key causes a counterclockwise rotation of the bellcrank 12, on a shaft 13 (FIG. 7) and lifts a link 10. Rising, the link 10 acts through an integral slotted lever 11 to rock a lever 7 which is pivoted at the point 8 on a latch 5. An end 7b of the lever 7 rests on an ear 4a of a latch 4 and it maintains this contact during the rocking movement of the lever 7. The latch 5, pivoted at 6, is forced to follow the counterclockwise movement of the lever 7 against the pull of a spring 9, so that end 5a is moved out of engagement with the tooth 1a of a rocker 1. The rocker 1 urged by a spring 14 (FIG. 1) rotates counterclockwise about a shaft 3 (FIG. 7), and projection 1a moves over the ear 5a. The counterclockwise rocking of the rocker 1 (FIG. 9) moves a pin 37 against an ear 36b of a lever 36. The lever 36, whose function is to hold the lever 4 in its normal position, is forced to rock clockwise and to release the lever 4. The latter follows the urgency of a spring 34 (FIG. 9a) and rocks clockwise until it contacts a pin 35 on the rocker 1. The effect of the release of the lever 4 is that a second depression of the "=" key cannot initiate another counterclockwise rocking of the rocker 1, even though the rocker 1 is restored to its normal position. Although the rocker 1, when returned to its normal position, will be once more held in its normal position by the latch 5, the rising of link 10 will not cause the lever 7 to rock the latch 5 since lever 7 is not resting on ear 4a at this time.

It will be recalled that the counterclockwise rocking of the rocker 1 occurs immediately upon the depression of the "=" key. This action precedes the clearing of the multiplier from the dials 122, and the subsequent entry of the multiplicand therein. Thus, before the multiplier value is cleared from the dials 122, the rocker 1 and its shaft 22 are rotated counterclockwise. The shaft 22 carries a number of gears 123 (FIG. 2) which are freely rotatable thereon. The gears 123 are brought into engagement with the segments 15 which form a part of the gear segment 115. When the gear segments 115 are restored to the normal initial position they rotate the gears 123 to positions which correspond to the multiplier value. Gears 123 are held there by the points 17a of a spring loaded comb 17, by means to be described. The multiplicand is entered into the gear segments 115 when the rockers 1 are in the normal position shown with gears 123 out of engagement with segment 15. A shaft 207 (FIG. 13), carried by an arm 152, is caused, by conventional means, to rotate counterclockwise about shaft 110. A pin 152a, in the upper part of the arm 152 contacts a lever 151, which is forced to rotate counterclockwise about its pivot 151a. This movement of the lever 151 forces an arm 151b, which is integral to the lever 151, to contact a stud 150 on the rocker 1, and to rock the rocker 1 clockwise. Thus, the rocker is returned to its normal position prior to the entry of the multiplicand.

When the rocker 1 is returned to its initial clockwise position, it is locked in such position by the ear 5a (FIG.

7) which is spring urged against the projection 1a. The condition of the machine is now as follows: the multiplier is represented in the gears 123, and the multiplicand is represented by the gear segments 115 and displayed in the dials 122 at the time that the multiplication operation is initiated.

Multiplication

In conventional machines, as well as in the machine according to the invention, the multiplier is not considered as a unit but as a series of independent multipliers. Each order of the multiplier factor constitutes a multiplication problem in itself, being, in effect, an intermediate summation.

Step Discs

It has been stated that the multiplier is represented in the gears 123. Integrally associated with each gear 123 is a step disc 2 (FIG. 3) which is divided into ten sectors 215, each of which serves for one of the digital values "1" to "9" including a sector 215-0 for the value "0." The sectors 215-1 and 215-2, for the values "1" and "2" respectively, are marked in FIG. 3. Each of the sectors 215 is divided into three subsectors which are identified in FIG. 4, for example, as 210-1, 211-1 and 212-1 for the value "1." There are corresponding subsectors in all other digital positions, for example, subsectors 210-5, 211-5, 212-5 for the value of "5." The step discs individually represent two types of information. The first type of information is represented in the subsectors 210. It relates to the number of cycles which will be necessary. The subsectors 210-1 to 210-5 are progressively notched each to a greater depth than the previous notch. The subsectors 210-6 to 210-9 are notched in such a manner that 210-6 corresponds to 210-4 and, likewise, for the pairs 210-7 and 210-3, 210-8 and 210-2, 210-9 and 210-1. The subsector 210-5, being the deepest notch has no counterpart, and the subsector 210-0 is not notched at all. The property of a multiplier digit is represented as being either non-shortcut or shortcut in the subsectors 211. The subsectors 212-0 and 212-1 to 212-5 are notched to a uniform depth. The subsectors 212-6 to 212-9 are not notched. FIG. 4 shows a "+" sign applied to the values 1 to 5 and a "−" sign to the values 6 to 9. In theory, the notched subsectors 212 represent non-shortcut values, the others shortcut values. In practical application, and as shown by the "+" and "−" signs, additive operations will be performed in the first group and subtractive operations in the second group. The value "0" is neither "+" nor "−" and the notch in this case serves a somewhat different function.

Aside from the information individually represented by each step disc, the subsectors 211 contain information which is meaningful only in the collective evaluation of the step disc in the operative order together with those in higher orders. The subsectors 211-1 to 211-9 are not notched at all. However, the subsector 211-0 is notched. As will be seen later, this property of the subsector 211-0 will serve in the handling of the value of "0" when it is an intermediate multiplier digit and also when it is adjacent the last significant multiplier digit. In the latter case it performs a function in the stopping of the machine.

Multiplier Clutch

The multiplication operation is initiated by engaging a multiplier clutch 73 (FIG. 11). Rising in response to the depression of the "=" key, through conventional linkage not shown, the link 10 (FIG. 13) rocks a lever 154 counterclockwise about the pivot 153 so that the ear 154a of the lever 154 is moved into the path of the pin 152a, the movement of which has been previously described. The lever 154 is pivoted on a stud 153 carried by lever 155. This permits the lever 154 to be forced to the left by pin 152a to the extent that a lever 156 can fall with its latching edge 216 behind a shaft 88 to lock the lever 154 in its actuated position and also to lock the "=" key in its depressed position. A control dog 74 of a clutch 73 is fixed to the shaft 75 and therefore the clutch dog 74 is rocked counterclockwise with the shaft 75 to engage the clutch 73. This causes rotation of shaft 45 (FIG. 8).

Sensing the Step Discs 2

Among the mechanical functions initiated by the rotation of the shaft 45 is the sensing of the numerical value represented by the lowest or rightmost, ordinal step disc 2. This value is sensed by the value feeler 41 (FIG. 3) which is disposed on a shaft 67 (FIG. 2) in such a manner that it can rock about the shaft 67 and also may be moved along the axis of the shaft 67. A shaft 60 passes through a hole 213 of the value feeler 41, the shaft being supported at one end by one arm of a toothed segment 68 (FIG. 8) and being suitably supported at its opposite end. Segment 68 is pivoted on the shaft 67 and a spring 127 (FIG. 1) urges shaft 60 and the value feeler 41 clockwise. This movement is restrained by an ear 81a (FIG. 8) of a lever 81 (FIGS. 8c and 11). The position of the lever 81 is determined by a cam follower 82 which, with its roller 85, engages a cam 83 on the shaft 45. A stud 82a in the lower end of follower 82 engages a notch in the lever 81. When the shaft 45 rotates, the cam follower 87 moves onto the low of the cam 84 and relinquishes its positive control over the lever 81. The spring 127 (FIG. 1) rocks the value feeler 41, and with it the lever 81, so that the tip 41a (FIG. 3) of the value feeler 41 contacts the step disc 2 of the lowest order. FIG. 3 shows the tip 41a in various positions.

It has been mentioned that the shaft 60, which passes through the value feeler 40, is located with its end in the tooth segment 68 (FIG. 8). Therefore, the tooth segment 68 follows the movement of the value feeler 41 and stands in a position which is determined by the depth of the notch in the subsegment 210-1 (FIG. 4). The tooth segment 68 rotates one tooth space 68b per unit. A stud 68a is disposed on the tooth segment 68 and controls the position of a link 69. The latter is guided by an internal slot engaging a fixed pin and connected by means of a stud 70a with a lever 70 on which an auxiliary clutch dog 71 is fixed. When the tooth segment 68 rocks clockwise, as described, the clutch dog 71 moves against the periphery of the clutch disc during rotation of shaft 45 the dog 71 enters the notch 73a and disengages the clutch. The shaft 45 is held in this position until the machine has performed the number of cycles indicated by the value in the multiplier disc 2 which has been sensed by the value feeler 41.

Starting the Main System

In order to simplify the description, certain intermediate mechanical processes shall be explained in detail hereinafter. This refers especially to the sensing of the subsectors 211 and 212 (FIG. 3). The description shall now proceed directly to the performance of the calculation in the first order.

The operation of the actuating mechanism, as distinguished from the multiplication control mechanism, described above, is initiated by a pin 134a (FIG. 12a) which is carried on a disc 134. The disc 134 rotates with the shaft 45 and pin 134a strikes a lever 135 and causes it to rock clockwise against the urgency of a spring. The lower leg of lever 135 has a slot 217 through which passes a pin 130a whose position shall be assumed for the present as substantially that shown in FIG. 12a. The pin 130a passes through the lever 135 into an open slot 136a of a lever 136. The lever 136 is freely pivoted on a shaft 218, which also carries the lever 135. When the pin 134a strikes the lever 135, the levers 135 and 136 are rocked counterclockwise, pulling a link 138 which initiates the operation of the numeral wheel actuating mechanism in the conventional manner as in the previously mentioned Hamann 300 calculating machine. It is a characteristic of this calculator that a value set up in the gear segments 115 (FIG. 1) is entered into the result register 205 either additively or subtractively, depending upon the ordinally escaped position of the carriage. The entry will be additive whenever the carriage is in the normal, full ordinal position, and it will be subtractive if the carriage is in a half-step position between normal ordinal positions. In any event the actuation of the numeral wheels is initiated for a number of cycles of operation determined by the value of the currently sensed multiplier digit.

*Shift of the Value Feeler 41*

It has been previously stated that the movement of the shaft 45 (FIG. 8) is arrested by the clutch dog 71 which is permitted to engage when the tooth segment 68 rocks in the sensing operation. For a multiplier value of "1" the tooth segment rotates one tooth space. It is returned to its home position during the first cycle of the operation of the actuating mechanism, as follows.

A cam 61 is disposed on a shaft 213 in the calculating mechanism and rotates once for every cycle of the actuating mechanism. Cam 61 reciprocates a link 65 by means of roller 62 and the follower 63 which is freely mounted on a shaft 64. The link 65 is attached to a lever 66 at 66a. The lever 66 is freely mounted on the shaft 67. The lower part of lever 66 carries a lever 77, freely mounted thereon, and which is spring urged for counterclockwise movement. In the initial position of lever 77 (FIG. 8a) an ear 219 is prevented from engaging the tooth segment 68 by the lower edge 276 of a blocking lever 76. The latter is rotated on shaft 67 under the control of the clutch dog 74. When the clutch dog 74 is withdrawn from the clutch disc 73, the lever 76 is moved by the pin and slot connection 76a so that the lower edge 276 no longer prevents the ear 219 of the lever 77 from engaging the teeth of the tooth segment 68.

The subsequent reciprocation of link 65 rocks lever 66 counterclockwise about shaft 67 and the tooth 219 of the lever 77 engages the tooth segment 68, pushing it up, one tooth per cycle of the calculating mechanisms, until it reaches its initial position. The immediate effect of the restoration of the tooth segment 68 to its initial position is that the pin 68a lifts the link 69 so that the clutch dog 71 is withdrawn from the clutch disc 73 and the shaft 45 is permitted to continue its cycle to the initial position shown.

It should be obvious that if the segment 68 stood at a value representative position of "4," for example, then it would require four cycles of actuation to restore the segment to its initial position. The tooth segment 68 is prevented from falling back by a pawl 78 (FIGS. 8b and 11) which is under the control of a cam 84 and the cam follower 87. A spring 79 pulls the pawl 78 clockwise into engagement with the tooth segment 68 (FIG. 8b). Normally it is prevented from engaging the tooth segment 68 by a lower arm 221 of the cam follower 87 which is in constant contact with a stud 78a on the pawl 78. The cooperation between the parts is such that the pawl is prevented from engaging the tooth segment 68 in all positions of the cam disc 84 except when the shaft 45 has been stopped by the clutch dog 71 in the partially rotated position, which occurs during numeral wheel actuation and return of segment 68, as described. The condition of the machine at this point is that the product of multiplication by a selected value has been entered in the product register, and the shaft 45 is about to complete its cycle.

The continuing movement of the shaft 45 and cam 83 (FIG. 11) moves the follower 82 into a position in which the pin 82a rocks the lever 81 counterclockwise, and through ear 81a (FIG. 8), holds the tooth segment 68 in the initial position shown. A disc 161 (FIG. 10) on the shaft 45 has a pin 46 which is now brought against a lever 42 and raises it. The lever 42 has an end 42a which underlies an ear 43a of a lever 43 and also engages a notch 44a in a slide 44, thus lifting the slide. The latter is rotatably attached to a bottom extension on a bellcrank 50. The bellcrank 50 is pivoted on shaft 49 and is attached to a pawl 51 which is rotatable on a stud 222 and urged by spring 54 (FIG. 10a). Thus, the upward movement of the link 44 results in clockwise movement of the pawl 51 (as seen in FIG. 10c) and in counterclockwise movement of the pawl as seen in FIG. 10a.

The pawl 51 engages a comb 56 (FIG. 10b) and displaces it one tooth space. A secondary effect of the movement of the pawl 51 is that the bellcrnak 50, which actuates the pawl 51, also contacts an ear 223 on a holding pawl 55. The pawl 55 is connected by a pin 58a to a bellcrank 58 which is so related to a spring 225 and a fixed plate 224 that it is toggled to either one of two positions. Upon the described actuation by the bellcrank 50, the bellcrank 58, in conjunction with the spring 225, yieldably urges the pawl 55 against the comb 56 and engages the first tooth from the top (FIG. 10b) when the pawl 51 advances the comb 56 one tooth as described. Thus, while the pawl 51 has moved the comb 56 one tooth in consequence of the movement of the shaft 45, the pawl 55 prevents the comb 56 from returning to its normal position under the urging of a spring 57 (FIG. 10). The comb 56 has two arms 56a and 56b (FIG. 10b) which support bushings 228 and 229. The latter embrace and are freely slidable on a shaft 53. The arms 56a and 56b also have holes through which the shaft 67 (FIG. 10) is passed. The value feeler 41 is also slideably located on shaft 67, as has been described before. The location is such that it must always occupy a definite relationship to the comb 56. Thus, the movement of the comb 56 results in a movement of the value feeler 41. This movement is sufficient to bring the value feeler 41 into a position in which it can sense the next higher order step disc 2. The movement of the link 44 (FIG. 10) has been transmitted through a described connection to the bellcrank 50 which has an arm 162 on a shaft 49. A stud 230 connects the arm 162 with a link 163 which rocks a bellcrank 164 to which a link 165 is attached. The movement of the link 44 results thus in a reciprocating movement of the link 165 which is so related to the carriage shift control mechanism that it initiates a shift of the carriage. This shift is equal in length to the ordinal distance between the numeral wheels of the product register. Meanwhile the shaft 45 completes its cycle; however, since the "=" key is still depressed, the clutch dog 74 remains disengaged from the clutch disc 73 (FIG. 8a) and another cycle of clutch 73 is started immediately. It will be identical to that just described. The entry, however, is made in the next ascending order of the product register.

*Shortcut Multiplication*

When a disc 2 stands at a value of "9", for example, the value feeler 41 operates in the same fashion as that described for the value "1". The tooth segment 68 (FIG. 8) is rotated the same distance, namely one tooth, because the value feeler 41 (FIG. 3) is stopped by the notch in the subsegment 210–9 which has the same depth as the notch in the subsegment 210–1.

In accordance with previous introductory explanations, the machine performs a subtractive operation in the current order and a positive operation in the adjacent higher order. This raises the question of how the application or non-application of the shortcut formula is accomplished. This feature has been omitted in the preceding discussions for the sake of simplicity. According to previous explanations the subsegments 212 (FIG. 4) are either notched or are not notched, depending upon the shortcut or non-shortcut quality of the entry. The subsegments 212 are sensed by a shortcut feeler 40.

The shortcut feeler 40 is slidably disposed on the shaft 67 which also carries the value feeler 41. It has a hole 214 through which a shaft 131 (FIG. 1) is passed. A spring 132, which is attached to the shaft 131, urges the shortcut feeler 40 clockwise against the step disc 2.

The shaft 131 is located in an arm 139 which is attached to a shaft 89 (FIG. 1). Consequently, the shaft 89 is urged counterclockwise. A lever 133 (FIG. 11) is fixed on the shaft 89 and is similarly urged counterclockwise; however, it has an ear 133a which limits the movement of the lever 133 by contacting a stud 81d whenever the lever 81 is in the initial position shown. When the lever 81 is not in the initial position, because of rotation of the shaft 45, the lever 81 is permitted to rotate counterclockwise. This causes the tip 40a (FIG. 4) of the shortcut feeler 40 to advance against the step disc 2 and sense one of the subsegments 212. The lever 133 has another arm 231 which in its upper part carries a pivot for a latch 157 which is urged counterclockwise by a spring 232 to engage and limit the clockwise rotation of a lever 158 which is rotatably disposed on a shaft 88 and urged clockwise by a spring 233.

During the sensing of the values "1" to "5" in the step disc 2, the subsegment 212, being notched for a non-shortcut value, the latch 157 moves to the left (FIG. 11) and permits the lever 158 to follow until the lower tail of the lever 158 contacts an ear 81c of the lever 81. The function of the lever 78 in securing the tooth segment 68 has been explained before; however, before the lever 78 is permitted to rotate into engagement with the tooth segment 68, that is, before it moves clockwise, it is forced by the peculiar construction of the cam 84 (FIG. 11) to execute a short counterclockwise motion. During the short counterclockwise motion of the lever 78, an arm 78b strikes an arm 157a (see also FIG. 8) of the latch 157. In the calculation with a non-shortcut value, this deflection of the lever 157 does not have any effect because the shoulder of the lever 157, which normally limits the movement of the lever 141, has been moved toward the left and away from this restraining position. The lever 157 then merely dips and returns to a position in which the lever 157 restores the lever 141 when the cam 83 acts through follower 82, pin 82a, lever 81 and pin 81d, ear 133a, lever 133 and shaft 89 to restore the latch 157 to the position shown.

Short-Cut Operations

If the shortcut feeler 40 (FIG. 4) senses a shortcut value, that is, it advances a shorter distance against the step disc 2, thus stopping at the outermost peripheral sector because the subsegment 212–9 does not have a notch, the latch 157 correspondingly moves a shorter distance. The lever 141 is not released from the lever 157. In this case, the short, counterclockwise actuation of the lever 78 will, by deflecting the latch 157, permit the ear 158a of lever 141 to ride the high edge of the latch 157, and still come into contact with the ear 81c of the lever 81 instead of ear 81a, as was the case when the value was not to be short-cut. Under these circumstances, the latch 157 does not restore the lever 141 when the latch is restored to the initial position and the lever 141 remains in contact with the ear 81c. The ear 81c rides along the edge 234 of lever 141 while it is returned to the normal position and it is embraced by a notch 235 in 141 (FIG. 11). This occurs near the end of the cycle of rotation of shaft 45.

Since the "=" key is still locked down at this time, the clutch control dog 74 is prevented from disengaging the clutch 73, and it continues to rotate. The cam 83 tends to permit the value feeler 41 (FIG. 2), as well as the shortcut feeler 40, to advance for the purpose of sensing the next higher step disc 2; however, the lever 141, because of the engagement of the notch-out 235 with the ear 81c, prevents such sensing. The shaft 45 continues to rotate during which it initiates a corrective cycle of actuation of the numeral wheels. During such a corrective cycle, shaft 231 (FIG. 8) is rotated, as previously described, and cam 61 causes a reciprocation of the link 65 (FIG. 8). This results in a movement of the tooth segment 68 past its normal position whereby the pin 68a displaces the lever 69 and rocks the bellcrank 70 clockwise about the shaft 72 until a pin 160 strikes the lever 158 and rocks it counterclockwise. The counterclockwise rocking of the lever 158 is sufficient to break the holding engagement of the notch 235 (FIG. 11) with the ear 81c and to move the ear 158a to a point where it is re-engaged by the shoulder on the latch 157.

Since the "=" key is still depressed, the shaft 45 passes through its home position and begins another cycle during which the next step disc will be sensed by the value feeler 41 and the shortcut feeler 40. The preceding explanation has disregarded the requirement that the product carriage must be set in a position in which it will be actuated subtractively. The position of the calculating carriage must be determined before the calculating mechanism is actuated in shortcut multiplication. This purpose is accomplished by the mechanism shown in FIG. 12a.

A lever 140 is keyed to the shaft 89 (see also FIG. 2) and is indicative of the position of the shortcut feeler 40. Depending upon the position of the shortcut feeler 40, the lever 140 assumes various positions opposite a bail 236 of a scanner 144. During a multiplication resulting from a non-shortcut value, a low portion 140b is aligned with the bail 236. The position of the scanner 144 is controlled by the disc 134 which controls the movements of a follower 149 with a roller 149a. The follower 149a is connected, at a point 149b, with a link 142 which in its lower integral portion 237 has an ear 238 in which a stud 142a is disposed. The stud 142a also engages an angular slot 148a in a lever 148 which pivots on a stud 239. The lever 148 is urged clockwise (FIG. 12b). A link 145 connects the scanner 144 with the link 142. When the high of the disc 134 contacts the follower 149, the link 142 is forced to rise whereby its lower end is guided by the slot 148a. However, the curved shape of the slot 148a forces the lower end of the link 142 to deflect to the left (as viewed in FIG. 12a). This lateral movement of the link 142 is communicated through the link 145 to the scanner 144 which rocks about its pivot 240 so that the bail 236 moves against the periphery of the lever 140. If a non-shortcut value is sensed by the shortcut feeler 40, a notch 140b is aligned with the bail 236 and the scanner is permitted to rock counterclockwise a distance which is sufficient to permit the link 142 to follow the slot 148a. If a shortcut value has been sensed by the shortcut feeler 40, the lever 140 rocks a shorter distance from its normal position because the tip 40a is stopped at the outer peripheral segment 212. When the link 142 rises under these circumstances, the scanner 144 strikes the tooth 140d, which prevents the scanner 144 from rocking as far counterclockwise as before. Consequently, the link 142 cannot follow the slot 148a as before but is forced to move upwardly relative to pin 142a after a short lateral movement. The lever 148 yields because it is held in its home position by a spring. The lower part 237 of the lever 142 has a left extension 142b and a right extension 142c. When the lever 142 rises in response to the sensing of a non-shortcut value, the extension 142b moves against an edge 244 of a left arm 242 on a shift cradle 143, rocking the shift cradle about a pivot 245. The extension 142c passes at the same time into a notch in a right arm 243 of the shift cradle 143. The effect of that interaction is that the shift cradle 143 is rocked clockwise if a non-shortcut value is sensed. If a shortcut value is sensed, the link 142 rises in a different plane, as has been explained. In that case, the extension 142b rises into a notch 240 of the left arm 242 of the shift cradle 143 so that it will neither affect the position of the shift cradle 143 nor obstruct its actuation by the right extension 142c. The latter rises against the lower edge of the right arm 243 which is so located that it permits the extension 142c to rock the shift cradle counterclockwise or, if it should already occupy that position, to contact it briefly.

It has been shown that, if a non-shortcut value has been sensed, the shift cradle 143 will be rocked clockwise unless it already occupies that position. If a shortcut value has been sensed, the shift cradle 143 will be rocked counterclockwise unless it already occupies that position. The position of the shift cradle 143 is reflected by a lever 47 which is connected by a stud 146 to a link 48. The latter is pivotally connected to the shift cradle 143 by a stud 246. Thus, the lever 47 must assume one of two positions depending upon the position of the shift cradle 143 which position, in turn, is determined by the value sensed by the shortcut feeler 40.

The opposite end of link 47 is attached to a shift link 147 corresponding to the rack 18 shown in the Patent No. 1,788,192, previously referred to. It is a characteristic of the shift link 147 that it controls the movement of the carriage 205 a half step to a position in which it can receive subtractive entries. Conversely, if the carriage is standing in a subtractive position, the movement of the link 47 controls the movement of the carriage for a half step into the additive position. Shortcut multiplication in any order involves negative actuation in the current order followed by at least a single cycle of positive actuation in the next adjacent higher order. Upon conclusion of the subtractive cycles in the lower order the product carriage is shifted one full order. Since the carriage was in the subtractive position at the beginning of this shift, it is moved a full step to the subtractive position in the next higher order. Then, during the operation of clutch 73, the disc 134 (FIG. 12a) forces the scanner 144 to sense the lever 140. Since this scanning operation occurs while the scanner 144 as well as the lever 140 is in the positive position (which is shown in FIG. 12), the scanner is not blocked and the link 142 is moved in such manner as to cause restoration of the product carriage a half step to the additive position. Thus, the machine is restored to the position in which it senses the next higher order step disc 2 in the next cycle of shaft 45 following the corrective, positive, cycle of actuation. Mechanism is provided, as described hereinafter, for preventing an automatic full step of shift following the corrective plus stroke, so that the multiplier disc 2 in the higher order may be sensed to determine the multiplier value standing therein.

Although the shaft 45 rotates once during the above mentioned corrective cycle, the comb 56 (FIG. 10b) is not shifted one ordinal tooth. This is prevented by a lever 166 (FIG. 10) which pivots on the shaft 67 and has a nose 166a which extends into the path of the shaft 60. The latter, it will be recalled, is carried by the toothed segment 68 (FIG. 8). When the segment 68 is moved one step past the normal position, the shaft 60 strikes the nose 166a and deflects the lever 166 counterclockwise (FIG. 10).

The previously mentioned lever 43 is freely mounted on the lever 166 at a point 167 and is clockwise urged by a spring 168. Upon counterclockwise movement of lever 166, the lever 43 is withdrawn from the notch 44a of the lever 44 and when the lever 42 is subsequently lifted by the pin 46, lever 42 cannot initiate a shift of the comb 56 because the ear 43a is no longer in the notch 44a. Thus the comb 56 is not shifted at the end of a corrective, plus, cycle. Since the link 44 does not move, the product carriage likewise is not shifted. After the corrective plus stroke, multiplication in that order is automatically initiated and the sequence of multiplication progresses from order to order.

When a "0" multiplier value is reached, the tip 41a (FIG. 3) is stopped at the outer periphery of the step disc 2, the value feeler 41 having moved a distance shorter than in the case of sensing a value "1" or "9." The shortcut feeler 40 also advances against the step disc 2 and its tip 40a enters a deep notch in the subsegment 212-0; however, a second tip 40b which extends into all higher orders of the multiplier discs 2 is stopped by the subsegment 211-1 in the next higher order which contains, for example, the value "1." Referring to FIG. 1, it will be observed that all subsectors 211 extend to the outer periphery, except the subsector 211-0. This permits a distinction to be made between the sensing of a "0" which is followed by other values and a "0" which is not followed by other values. This shall be discussed in more detail in connection with the termination of operations. The effect of the stopping of the shortcut feeler 40 in a position in which the tip 40b is stopped at the periphery of the step disc 2 is that the notched lever 140 (FIG. 12a), whose movement has been discussed above, is lifted higher than in the case of a non-shortcut value. The scanner 144 is then permitted to enter into a lower portion of the notch 140b with the effect that the product carriage is shifted a half step to the additive position if it is not already there. This shift, however, has no significance. Since a zero is sensed the shaft 45 progresses through one complete cycle and the value feeler 41, as well as the shortcut feeler 40, is restored to its home position. Also the comb 56 is shifted a full step. According to previous explanations, the operation of the actuating mechanism is initiated by the movement of the lever 136 which, in the case of a nonshortcut or a shortcut value, is connected to the lever 135 (FIG. 12a) by the pin 130a. The pin 130a is disposed on a link 130 which is freely pivoted at 140a on the lever 140. Thus, the pin 130a assumes distinct positions in the slot 136a, depending upon the position of the lever 140. Also, according to previous explanations, the lever 140 stands in one position when a shortcut value is sensed. It rocks a greater distance when a non-shortcut value is sensed, and in the case of a "0 with values sensed ahead," it rocks a still greater distance. The pin 136a moves according to the movements of the lever 140 within the slot 136a. For a non-shortcut value and for a shortcut value, it remains within the lower part of the slot 136. For the sensing of "0 with a value ahead," it moves upwardly to the extent that, when the lever 135 is deflected by the pin 134a on the disc 134, it no longer forces the lever 136 to follow. Consequently, in this case, the link 138 does not reciprocate and the operation of the actuating mechanism is not initiated; however, the product carriage is shifted, as previously explained and now stands in the next higher ordinal position.

Figure 5:
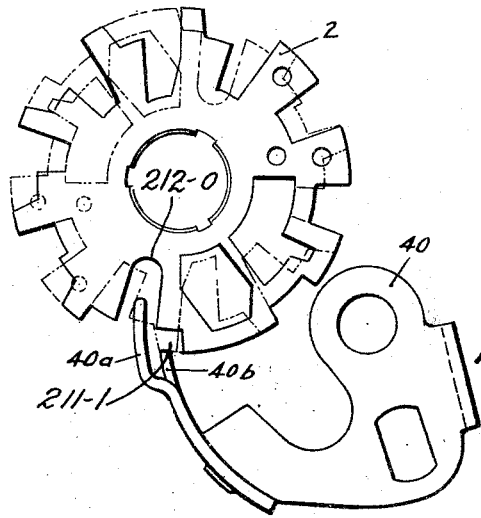
Figure 6:
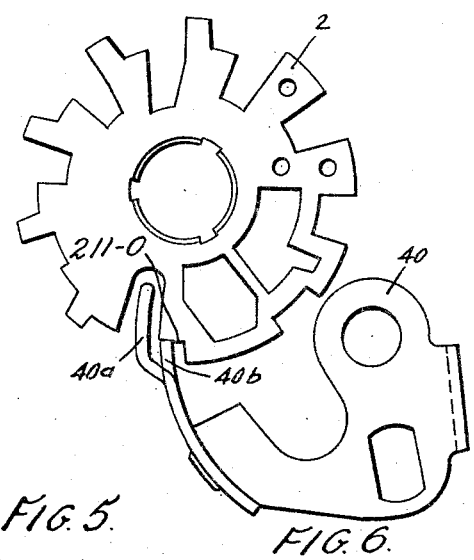

Upon conclusion of the actuation required for the last ordinal multiplier value, a shift occurs and the value feeler 41 and the shortcut feeler 40 are once more rocked to sense the disc 2. This disc stands at a value of "0" and there are no higher order significant values contained in the machine. The value feeler 41 senses the step disc 2 as shown in FIG. 4. The effect of this has been previously described. Meanwhile, the shortcut feeler 40 senses the step disc 2 as shown in FIG. 6. By comparison with FIG. 5, it is obvious that the shortcut feeler 40 rocks clockwise a greater distance than in any of the previous sensing operations and the tip 40b contacts the notch in the subsegment 212-0. This is possible only when there are no values in the higher order step discs 2.

The lever 140 is fixed to shaft 89 as also is a lever 176 (FIG. 14) and which assumes positions determined by the lever 140. Lever 176 reaches a maximum deflected position when the shortcut feeler 40 is in the position of FIG. 6. In this maximum deflected position, the lever 176 moves the stud 177 carried thereby into a position above an ear 178a of a hanger 178.

The hanger 178 is embraced by ears 180a and 180b of a lever 180 (FIG. 14), and the lever is fixed to the shaft 80 which also carries the lever 78 (FIG. 11). Since the lever 78 is also fixed to the shaft 80, the lever 180 executes rocking movements which correspond to those of the lever 78. Specifically, the lever 78 and, consequently, lever 180 rock counterclockwise at the beginning of the cycle of rotation of the shaft 45. During this counterclockwise movement, the lever 180 moves the lever 178 out of the path of the stud 177. Ordinarily, this movement is unnecessary because the stud 177 will not come up high enough to conflict with the ear 178a. However, when the shortcut feeler 40 is in the position of FIG. 6, the stud 177 moves upwardly and passes the normal position of the ear 178a. Then, when lever 176 and stud 177 are returned to the position shown the stud 177 strikes the ear 178a, pulling the hanger 178 down. The hanger 178 has a stud 185 which, during the downward movement of the lever 178, strikes an ear 186b of a lever 186. The latter acts through a bar 187 and a bellcrank 188 to pull a link 189 toward the right and initiate the operation of a mechanism for returning the product register to its initial leftmost position. The downward movement of the hanger 178 also prevents a further shifting of the comb 56 (FIG. 10b) which would occur near the end of the cycle of operation of the shaft 45. The hanger 178 is pivoted on a lever 181 fixed on the shaft 88. A cam surface 181a is in contact with a stud 182 of the lever 166 and deflects the latter when the hanger 178 moves downwardly. The effect is the same as in the case of a corrective cycle. The lever 43 (FIG. 10) is withdrawn from the notch 44a so that the lever 42 cannot lift the link 44.

The movement of the hanger 178 also terminates the engagement of the clutch 73 and rotation of the shaft 45. Since the lever 181 (FIG. 14a) is pinned to the shaft 88, the shaft 88 rocks in consequence of the movement of the hanger. A lever 183, also fixed on shaft 88 (FIG. 14), carries a pin 184 which strikes the latch lever 156 (FIG. 13). The latter, it will be recalled, has a notch 216 which engages the shaft 88 upon depression of the "=" key. Thus, when the lever 156 is rocked counterclockwise, it responds to spring 248 (FIG. 14) which moves it to the position of FIG. 13 and also forces the clutch dog 74 to engage the clutch disc 73 (FIG. 14). The drive of the shaft 45 is terminated and the return of the lever 156 permits the "=" key to rise.

The movement of the hanger 178 brings an ear 178b against an ear 58b (FIG. 14) of the lever 58, deflecting it. This actuation returns the lever 58 to its normal position in which it keeps the latch 55 rocked out of the comb 56. The comb 56 and with it the value feeler 41 and the shortcut feeler 40 return to their initial positions in response to spring 57.

The various parts of the mechanism are now in the normal initial position with the exception of the step discs 21 which retain the last multiplier value entered therein, and the lever 4 (FIG. 9a) which remains in the clockwise position shown.

*Constant Multiplier*

Figures 7, 7A:
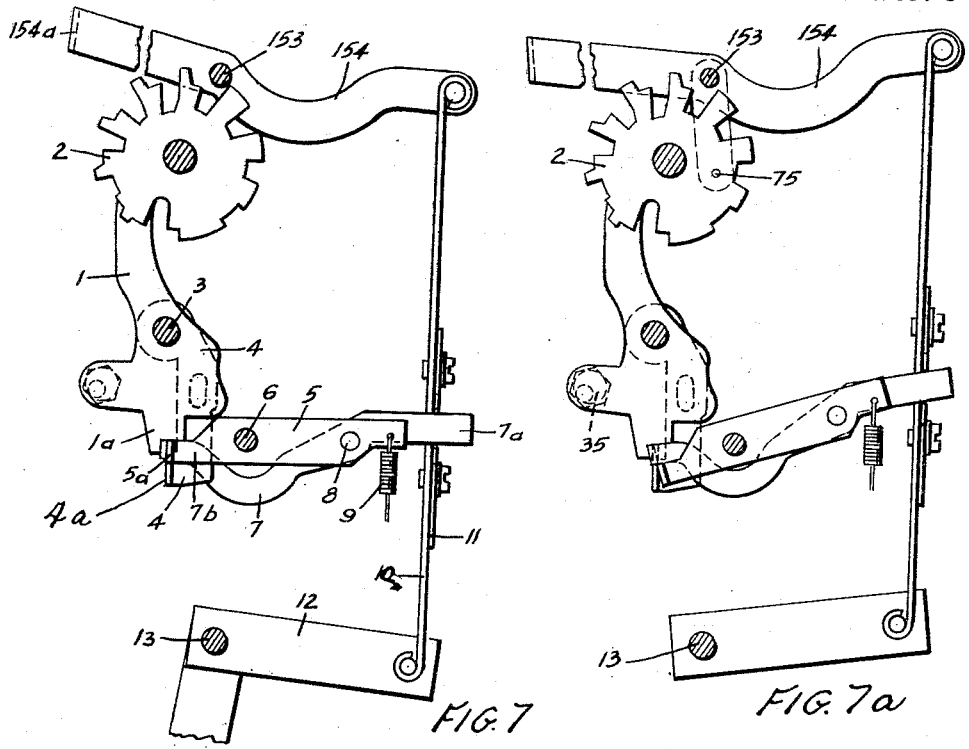
FIGS. 7 and 7a are right side sectional views of the ordinal multiplying terminating mechanism.

The value standing in the step discs 2 may be used as a constant multiplier. With the lever 4 standing in the position shown in FIG. 9a, the leftmost end of lever 7 is free to rock counterclockwise when the link 11 is moved upwardly by depression of the "=" key. Therefore lever 5 remains in locking engagement with the rocker 1 (FIG. 7). The effect of a depression of the "=" key will be the same as before in all other respects so that a new multiplication will result in which the stored value is the multiplier value.

The multiplier discs 2 may be reset to zero by depression of the "×" key either with or without new entry. In either case, the movement of the "×" key 126 is transmitted to a bellcrank 111 on a shaft 13 (FIG. 1). A link 23 is pivoted on the bellcrank 111 at the point 111a and lifts a locking comb 17 (FIG. 2) from its engagement with the gears 123. The step discs 2 are now free to be returned to their initial positions as follows. The bellcrank 111 is fixed on the shaft 13 so that movement is communicated to the shaft 13 and also to the lever 249 (FIG. 9) which is also fixed on the shaft 13. The lever 249 rocks a lever 31 clockwise about the shaft 32. The lever 31 has a cam edge 250 which rocks a lever 27 about a pivot 251 on a lever 26 so that the opposite, hook-shaped, end 252 of the lever 27 is brought into a position of proximity with respect to a stud 29 on a lever 30 which rocks about a shaft 30a.

The depression of the "×" key thereafter activates cam elements of conventional design which cause the lever 30 to rotate counterclockwise about the shaft 30a. At such time the stud 29 engages the hook 252 and the force exerted against the lever 27 causes the lever 26 to rotate counterclockwise about the shaft 3. An ear 26a on the lever 26 contacts and displaces a geared segment 25 from the position shown in FIG. 9a to that shown in FIG. 9. Segment 25 is engaged with a gear 24 integral with shaft 22 and a number of discs 21 having noses 253, are fixed on the shaft 22, being so positioned that the noses contact pins 20 on the step discs 2, thus restoring the step discs 2 to their normal positions during the described rotation of the shaft 22. The step discs 2 are locked in initial positions by the spring comb 17. During the counterclockwise movement of the lever 26, it strikes the lever 4 (FIGS. 9 and 9a) and moves lever 4 to the position shown in FIG. 9 where it is locked by the latch lever 36 whose nose 36a is cammed up against spring force by the returning lever 4. This restores the multiplier control mechanism to the initial condition.

*Negative Multiplication*

A negative key (not shown) is provided which is connected by conventional linkages with a bar 169 (FIG. 12c). The bar 169 is bent to engage one end of a slot 170a in a fixed bracket 170. The bar 169 can assume two positions depending upon the position of the negative key. In the normal position which is shown in FIG. 12c, it occupies the left end of the slot 170a. In the other position it moves in the slot 170 to the dotted line position. A lever 171, on a shaft 172 has a slot which also embraces the hooked part of the bar 169. Depending upon the position of the bar 169, the lever 171 stands either in the normal position shown in FIG. 12a or in what may be called the negative position shown in FIG. 12c. The scanner 144 is pivoted on the lever 171 at the point 174. When the lever 171 is in the normal position, the operation of the scanner 144 with respect to the lever 140 (FIG. 12a) will be like that previously described.

When the lever 171 is in the negative position, the scanner 144 rises so that it occupies a position in which it scans the tooth 140d when non-shortcut values are sensed by the shortcut feeler 40. For shortcut values it scans the space 140e. During the scanning which takes place in a corrective cycle, the scanner contacts the tooth 140c instead of the space 140e. The effect of this is that the operation of the shift cradle 143 is reversed.

What is claimed is:

1. A calculating machine comprising a value entry mechanism, a product register, a multiplicand factor receiving mechanism, a multiplier factor receiving mechanism, product register actuating means which are settable by the multiplicand factor receiving mechanism and cyclically operable under the control of the multiplier factor receiving mechanism, a multiplicand value entry key and a multiplier value entry key; in combination with: respective means for resetting the two factor receiving mechanisms to zero registration; means responsive to depression of the multiplicand value entry key for initiating the operation of the multiplier factor resetting means and for transferring a value from the value entry mechanism into the multiplicand factor receiving mechanism; and means responsive to depression of the multiplier value entry key for transferring a value from the multiplicand factor receiving mechanism into the multiplier factor receiving mechanism, for transferring a value from the value entry mechanism into the multiplicand factor receiving mechanism, and for initiating the operation of the product register actuating means.

2. A calculating machine as defined in claim 1, including a back-transfer mechanism for transferring a value from the product register into the value entry mechanism whereby subsequent depression of the multiplicand and multiplier value entry keys enters the back-transferred value into the multiplier factor receiving mechanism and initiates the operation of the actuating means.

3. A calculating machine as defined in claim 1, in which depression of the multiplicand value entry key conditions the multiplier factor receiving mechanism to receive a value from the multiplicand factor receiving mechanism, and in which depression of a multiplier value entry key, in the absence of prior depression of the multiplicand value entry key merely initiates the operation of the actuating means.

4. A calculating machine as defined in claim 1, including means for shifting the product register relative to the actuating means by full ordinal increments of shift and also by partial increments of ordinal shift, a drive reversing mechanism between the actuating means and the product register, means responsive to shifting of the product register to a partial increment shifted position to enable the reversing means to reverse the direction of drive to the product register and cause a negative registration therein, and responsive to shifting the product register to a full ordinal position for enabling the reversing means to drive in a positive direction, means for sensing the values standing in the multiplier value receiving mechanism, and means responsive to said sensing means for controlling full ordinal or partial increments of operation of said shifting means.

5. A calculating machine as defined in claim 4 including a first clutch and a second clutch, means responsive to the depression of the multiplier value entry key for initiating the operation of the first clutch, means operable by the first clutch for enabling said sensing means, said second clutch being provided for driving the product register actuating mechanism, and means controlled by said sensing means for engaging said second clutch.

6. A calculating machine as defined in claim 5 including means controlled by the sensing means for holding the second clutch engaged for one or more cycles of operation thereof.

References Cited in the file of this patent
UNITED STATES PATENTS

| | | |
|---|---|---|
| 2,572,921 | Gang | Oct. 30, 1951 |
| 2,611,539 | Toorell | Sept. 23, 1952 |